(12) United States Patent
Holland et al.

(10) Patent No.: US 9,294,384 B2
(45) Date of Patent: Mar. 22, 2016

(54) DISTRIBUTED SERVICE ROUTING PROTOCOL SUITABLE FOR VIRTUAL NETWORKS

(71) Applicant: Skytap, Seattle, WA (US)

(72) Inventors: Peter Holland, Seattle, WA (US); Bradley M. Schick, Seattle, WA (US)

(73) Assignee: Skytap, Seattle, WA (US)

( * ) Notice: Subject to any disclaimer, the term of this patent is extended or adjusted under 35 U.S.C. 154(b) by 24 days.

(21) Appl. No.: 13/842,766

(22) Filed: Mar. 15, 2013

(65) Prior Publication Data

US 2014/0247727 A1 Sep. 4, 2014

Related U.S. Application Data

(60) Provisional application No. 61/771,780, filed on Mar. 1, 2013.

(51) Int. Cl.
*H04L 12/28* (2006.01)
*G01R 31/08* (2006.01)
*H04L 12/751* (2013.01)

(52) U.S. Cl.
CPC ..................................... *H04L 45/02* (2013.01)

(58) Field of Classification Search
CPC ......... H04L 41/02; H04L 45/26; H04L 45/48; H04L 12/28; H04W 76/02; H04W 76/00; H04W 76/022; H04W 4/00; G01R 31/08

USPC ......... 370/400, 401, 398, 399, 351, 390, 389, 370/392, 396, 410, 411, 428, 429, 241, 242, 370/244, 250, 251, 252, 254, 255, 216–221, 370/225–228

See application file for complete search history.

(56) References Cited

U.S. PATENT DOCUMENTS

| | | | | |
|---|---|---|---|---|
| 6,779,039 | B1 * | 8/2004 | Bommareddy | ... H04L 29/12009 709/226 |
| 7,031,275 | B1 * | 4/2006 | Borella | ............. H04L 29/12924 370/328 |
| 7,152,179 | B1 * | 12/2006 | Critchfield | .......... H04L 12/2602 714/4.11 |
| 7,286,468 | B2 * | 10/2007 | Scudder et al. | ................ 370/219 |
| 8,027,247 | B2 * | 9/2011 | Wang | ............................. 370/216 |
| 8,223,687 | B2 * | 7/2012 | Cheever et al. | ................ 370/328 |
| 8,780,920 | B2 * | 7/2014 | Bahr et al. | .................. 370/395.2 |
| 2009/0122724 | A1 * | 5/2009 | Rosenberg | ...................... 370/255 |
| 2010/0215019 | A1 * | 8/2010 | Velev | ...................... H04W 8/06 370/331 |

* cited by examiner

*Primary Examiner* — Hahn N Nguyen
(74) *Attorney, Agent, or Firm* — Perkins Coie LLP

(57) ABSTRACT

A dynamic service routing protocol (DSRP) communicates messages (e.g., containing information regarding network routes and tables) across a partial-mesh network of nodes. Gateway nodes (i.e., computing devices that operate as a final sink point for a service route) are connected to edge routers (i.e., computing devices that operate as a transit for a service route) but not necessarily to other host nodes. Gateway nodes asynchronously and/or dynamically send DSRP messages for updating the router nodes' routing tables and to minimize manual route configuration.

14 Claims, 9 Drawing Sheets

DISTRIBUTED SERVICE ROUTING PROTOCOL SUITABLE FOR VIRTUAL NETWORKS

BACKGROUND

To avoid having a single-point-of-failure (SPOF), some traditional routing protocols, such as RIP or EIGRP, favor using a fully-meshed network where each node is connected to each other node. In a full-mesh network, each node maintains its routing tables and advertises its neighbor tables to each other node in the network. A node's neighbor table includes a list of nodes immediately adjacent to a given node. Routing tables include information regarding how and to which adjacent node ("neighbor") to route network traffic (i.e., data packets). The larger the number of nodes in the network, the greater the number and size of neighbor tables and routing tables ("network tables"). Nodes exchange network table contents to other nodes so that the same network topology information is available in every node.

BRIEF DESCRIPTION OF THE DRAWINGS

One or more embodiments is illustrated by way of example and are not limited to the figures of the accompanying drawings, in which like references indicate similar elements.

DETAILED DESCRIPTION

Figure 1:
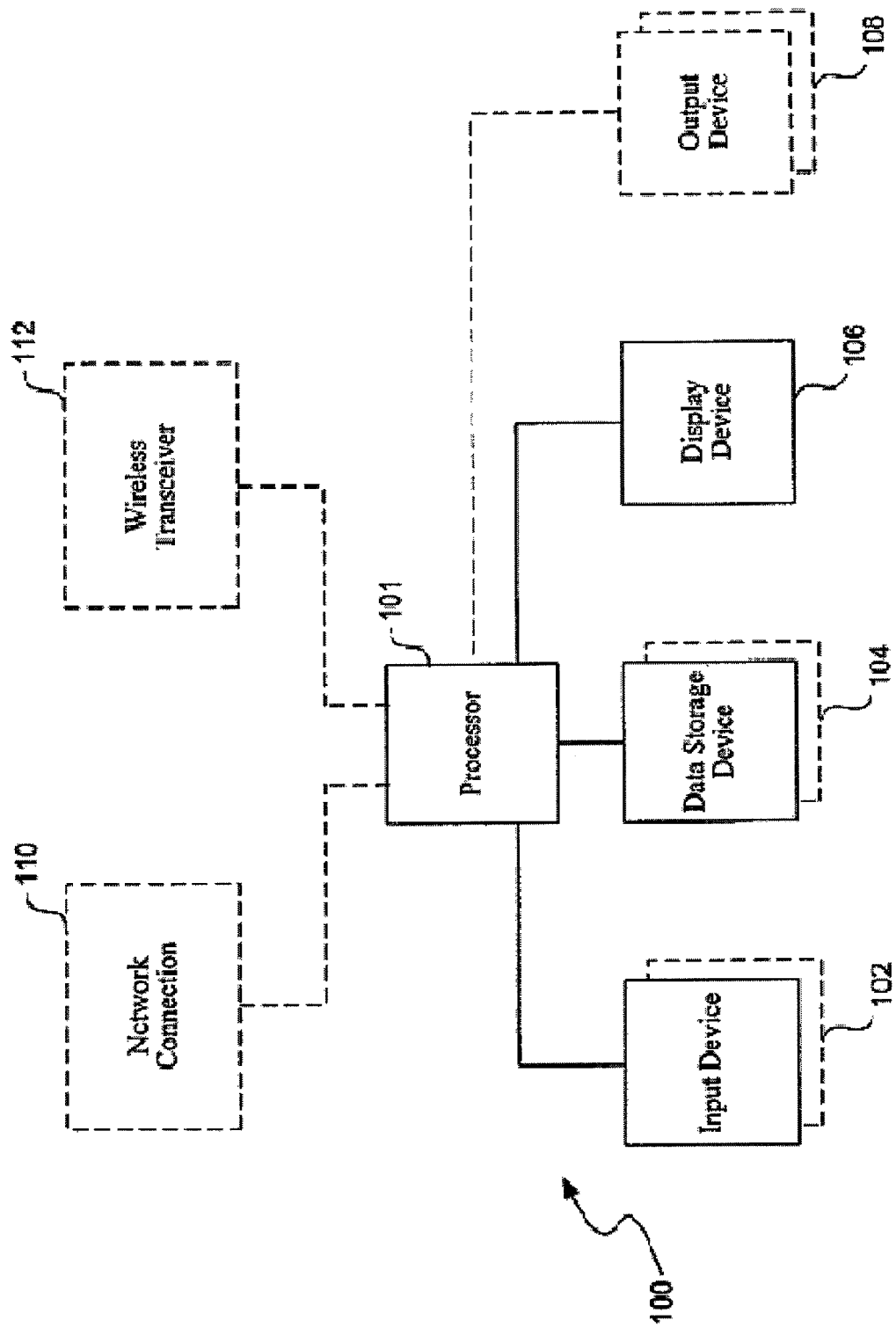
FIG. 1 shows an environment of a basic and suitable computer that may employ aspects of the software and/or hardware facilities.

The inventors have recognized that, in virtual computing environments (e.g., having thousands or more virtual network nodes), network table maintenance, routing protocol traffic overhead, and other network operations based on traditional routing protocols (e.g., EIGRP) inefficiently use network resources and are a burden to the network, nodes, and management operations.

Accordingly, the inventors have developed a routing protocol that communicates messages on a partial-mesh network of nodes for facilitating Internet (or local) data, for example, to a customer node (CN) (e.g., a virtual machine (VM) in a virtual network) via one or more edge routers (ERs) (i.e., computing devices ("transit routers") that each operate as a transit for a route) and gateway routers (GRs) (i.e., computing devices ("leaf routers") that each operate as a final sink point for a route). Internet traffic destined to a CN is, in some embodiments, received at an ER and, based on ER's routing table, routed to a GR for delivery to the CN. In some embodiments, an ER is a distribution router that is between another ER and GR. Distribution routers are used to effectively segment the underlying subnets into more manageable parts for the purposes of scalability.

A software and/or hardware facility communicates distributed service routing protocol (DSRP) messages, via a network, from GRs to ERs but not between GRs. ERs communicate DSRP messages to other ERs that in turn communicate DSRP messages to other GRs. To construct its neighbor node(s), in one embodiment, a ER sends (e.g., broadcasts) message(s), such as 'hello' messages, to discover GRs and/or other ERs that are coupled to the ER's network interface and on the same network subnet. A GR monitors network traffic via its network interface card and, in some embodiments, receives the ER's 'hello' message. The GR updates its neighbor table to include an entry for the ER because now the GR "knows" that ER is at least one of its neighbor nodes. In response, the GR sends (e.g., via unicast) a hello message to the ER and the ER modifies its neighbor table by associating the GR with the network interface that received GRs' hello message. The GR and ER continue to periodically send each other these hello messages in a "heart beat-like" fashion to ensure that both the GR and the ER are available to receive traffic. If either GR or ER become unavailable (e.g., due to a system failure) the available node (e.g., the ER) detects that it is no longer receiving the unavailable nodes hello message. After a period of time (e.g., an age out time), the available node will flush the unavailable node's (e.g., the GR's) entry from its neighbor table and any routes associated with the node from its route table. A routing table includes route entries for directing network traffic (e.g., packets) to each node in its neighbor table. ERs communicate neighbor tables to other ERs to converge network routes across the network to avoid SPOF, for example. Communicating messages to and converging neighbor and routing tables at the ERs, and not the GRs, provides some advantages of traditional networks, such as reliability (e.g., avoiding SPOF), and provides additional benefits, such as smaller neighbor and routing tables.

For example, in some embodiments, a GR operates as a sink point (i.e., an end point) for a network address and/or network address-port pair (e.g., 192.168.1.1:1234). To establish a route to the sink point, the GR advertises to its neighbor ERs that the GR is the sink for that the network address-port, for example. The ERs add routes to their routing tables to route traffic destined to the network address-port pair, for instance, to the interface connecting the ER and the GR. In some embodiments, establishing routes based on network address-port pairs that provides the benefits that the same IP address can be used for multiple different sink points because each sink point is individually addressable by a unique port (e.g., TCP/UDP) in the address-port pair. For example, a route entry to IP address 192.168.1.1 (paired with TCP 1234) can be used for routing network traffic to a first GR (e.g., GR1), while a separate route entry to IP address 192.168.1.1 (paired with TCP 5678) can be used for routing network traffic to a second GR (e.g., GR2). In some embodiments, the same IP address can be paired with different types of ports (e.g., the same IP address can be separately paired with a TCP and a UDP port). As mentioned above, a GR and ER periodically exchange "heart beat-like" hello messages to inform each node that the other node is properly functioning. When GR1 unexpectantly becomes unavailable, certain conventional routing technologies would continue to route packets to GR1 because the ER has not been informed (e.g., via a message from GR1) of GR1's unavailability. To avoid packet loss, the software and/or hardware facilities configures (e.g., by a network provisioning system and/or a management facility) a new GR (e.g., GR2) that is to be a sink for the same network address-port pair that was previously advertised by GR1.

In some embodiments, each GR and ER (and their respective tables) is associated with one or more domains. A domain is a virtualization of network space. For example, each domain has its own GRs, ERs, and network tables that communicate, via DSRP messaging, across a network. One domain can operate using the same subnet as another domain because each domain is isolated. For example, Domain 1 can include an ER that services routes for the 10.0.0.0/24 subnet simultaneously as the same ER services the same 10.0.0.0/24 subnet for Domain 2. In some embodiments, use of a particular domain is conditioned on the occurrence of an event. For example, ERs and GRs can operate using network tables associated with a first domain when a CN is attempting to connect with a specific node, but operate using network tables associated with a second domain in all other communications. In another example, the software and/or hardware facilities use a particular domain's configurations based on conditions of various types, such as a time of day, user or network permission, and/or network protocol (e.g., IP, Ethernet). The occurrence of an event can trigger the software and/or hardware facilities to switch from operating using one domain to operating using a different domain. In some embodiments, to distinguish domains, a unique domain ID is associated with each domain (e.g., 123456ABCD=Domain 1). Each DSRP message (e.g., hello message, etc.) includes a domain ID and each network table (e.g., neighbor table, route table) is associated with a respective domain ID. A data packet is associated with a default domain until the data packet(s) become associated with a different domain. In various embodiments, to determine a route for a packet stream, the software and/or hardware facilities compares the domain ID associated with a DSRP message to the unique domain ID associated with each domain. If there is a match, one or more packets of the packet stream operate under the characteristics of that domain (e.g., the data packets will route based on a routing table that is associated with the same domain ID as Domain 1, for example.)

Various embodiments of the software and/or hardware facilities are described below. The following description provides specific details for a thorough understanding and enabling description of these embodiments. One skilled in the art will understand that the software and/or hardware facilities may be practiced without many of these details. Additionally, some well-known structures or functions may not be shown or described in detail, so as to avoid unnecessarily obscuring the relevant description of the various embodiments.

The terminology used in the description presented is intended to be interpreted in its broadest reasonable manner, even though it is being used in conjunction with a detailed description of certain specific embodiments of the software and/or hardware facilities. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIG. 1 and the following discussion provide a brief, general description of a suitable computing environment in which aspects of the software and/or hardware facilities can be implemented. Although not required, aspects of the software and/or hardware facilities may be described herein in the general context of computer-executable instructions, such as routines executed by a general or special-purpose data processing device (e.g., a server or client computer). Aspects of the software and/or hardware facilities described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the software and/or hardware facilities may be distributed over the Internet or over other networks (including wireless networks) on a propagated signal on a propagation medium (e.g., an electromagnetic wave, a sound wave) over a period of time. In some implementations, the data may be provided on any analog or digital network (packet switched, circuit switched, or other scheme).

The software and/or hardware facilities can also be practiced in distributed computing environments where tasks or modules are performed by remote processing devices, which are linked through a communications network, such as a Local Area Network (LAN), Wide Area Network (WAN), or the Internet. In a distributed computing environment, program modules or sub-routines may be located in both local and remote memory storage devices. Those skilled in the relevant art will recognize that portions of the software and/or hardware facilities may reside on a server computer, while corresponding portions reside on a client computer (e.g., PC, mobile computer, tablet, or smart phone). Data structures and transmission of data particular to aspects of the software and/or hardware facilities are also encompassed within the scope of the software and/or hardware facilities.

Referring to FIG. 1, the software and/or hardware facilities employs a computer 100, such as a personal computer, workstation, phone or tablet, having one or more processors 101 coupled to one or more user input devices 102 and data storage devices 104. The computer 100 is also coupled to at least one output device such as a display device 106 and one or more optional additional output devices 108 (e.g., printer, plotter, speakers, tactile or olfactory output devices). The computer 100 may be coupled to external computers, such as via an optional network connection 110, a wireless transceiver 112, or both. For example, network hubs, switches, routers, or other hardware network components connected directly or indirectly to the network connection 110 and/or wireless transceiver 112 can couple one or more computers 100.

The input devices 102 may include a keyboard and/or a pointing device such as a mouse. Other input devices are possible, such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video discs (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1).

Each of the above-mentioned features of the software and/or hardware facilities is further described below.

Figure 2:
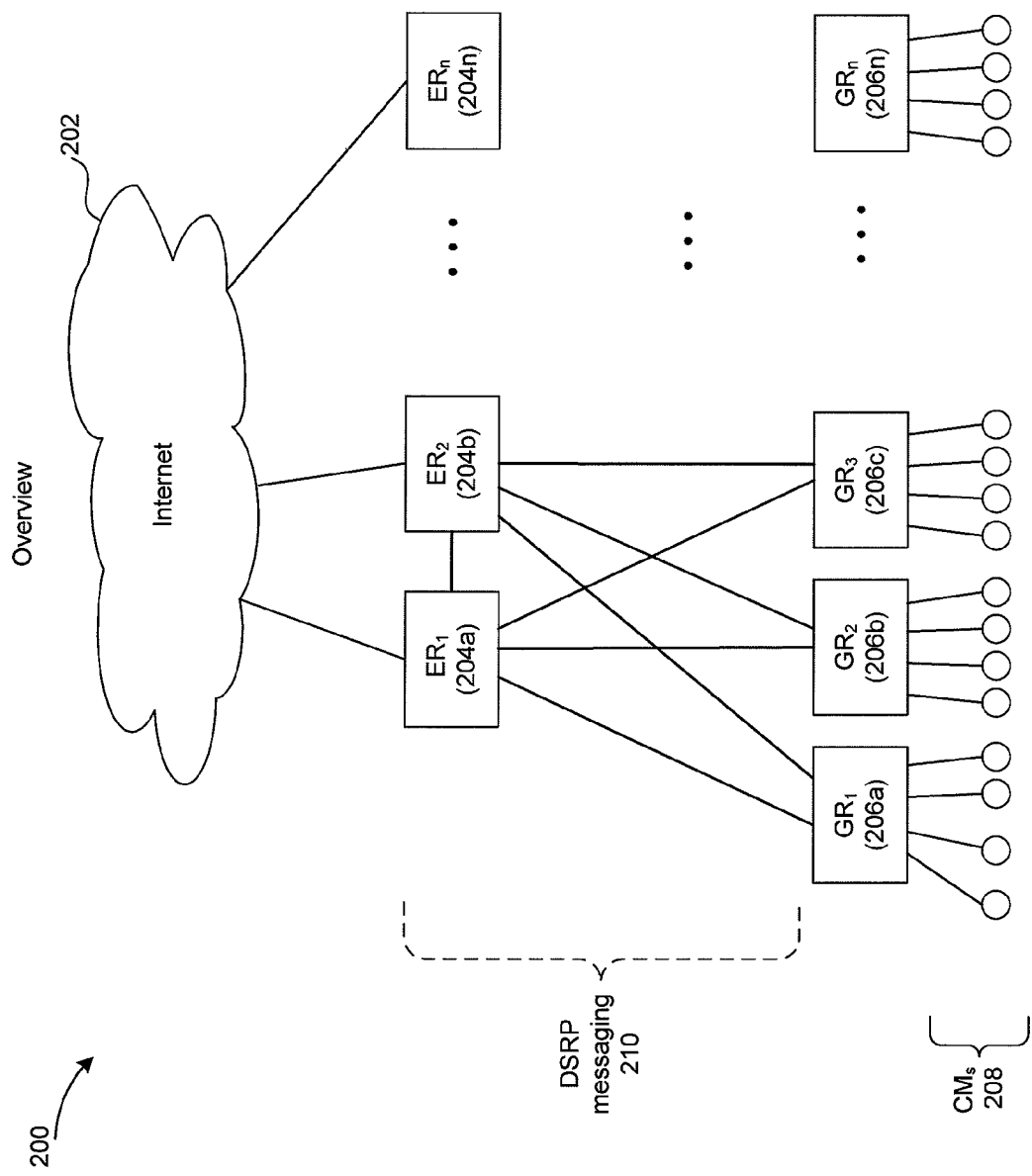
FIG. 2 is an example of a virtual network that can implement features of the software and/or hardware facilities.

FIG. 2 is an example of a virtual network 200 that is used to implement features of the software and/or hardware facilities. FIG. 2 includes the Internet 202 (and/or, any number of networks, such as a service provider network, LAN, management network, etc.), ERs 204a-204n, GRs 206a-206n, and virtual machines ("CNs") 208. In some embodiments, a ER (e.g., ER1 204a) is communicatively coupled to the Internet 202 and/or to GRs 206a-206n. In this example, ERs 204a-204b are fully meshed (i.e., have point-to-point connections) to each GR 206a-206n. For example, ER1 204a is communicatively coupled to GR1 206a, GR2 206b, and GR3 206c. Each GR 206a-206n is connected to one or more ERs 204a-204n, however, GRs 206a-206n are not connected to each other. DSRP messages 210 (e.g., routing table information, neighbor table information, hello messages, and route advertisements) are exchanged, in some embodiments, between ERs 204a-204n and GRs 206a-206n. In some embodiments, DSRP messages 210 are exchanged between ERs 204a-204n. For example, ER 204a can exchange its neighbor table (further described in FIGS. 3-5) to ER 204b, and vice versa. Host node 206a-206n may optionally be connected to CNs 208, or other downstream nodes (e.g., routers, switches, firewalls), however, downstream nodes are not required to implement DSRP and other aspects of the software and/or hardware facilities. In some embodiments, GRs 206a-206n can optionally provide various services to virtual machines 208 and other downstream nodes. For example, GRs 206a-206n can provide network address translation (NAT) services for CNs 208.

Figure 3:
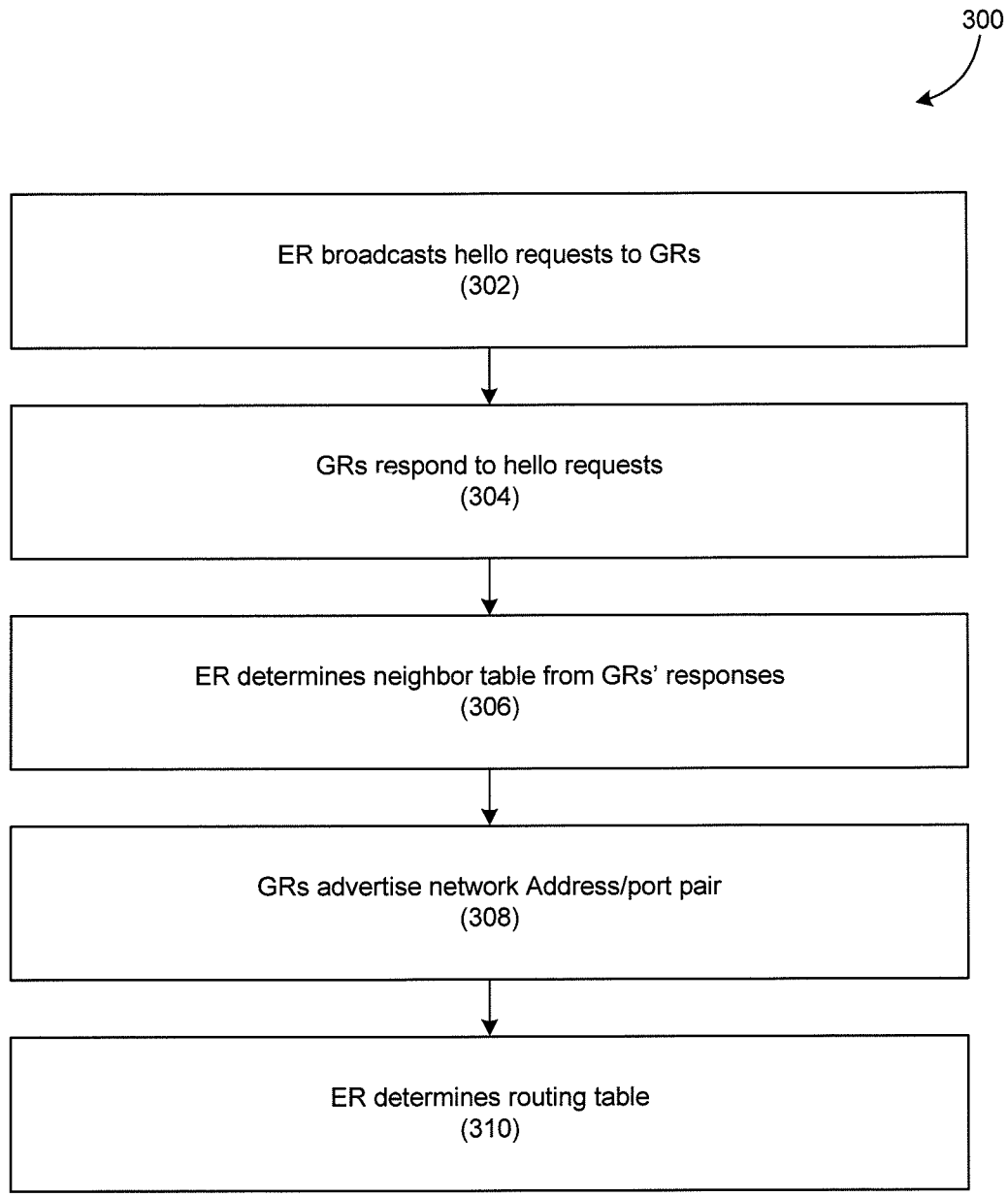
FIG. 3 is a flow diagram illustrating one example of how the software and/or hardware facility creates neighbor tables and routing tables.
Figure 4:
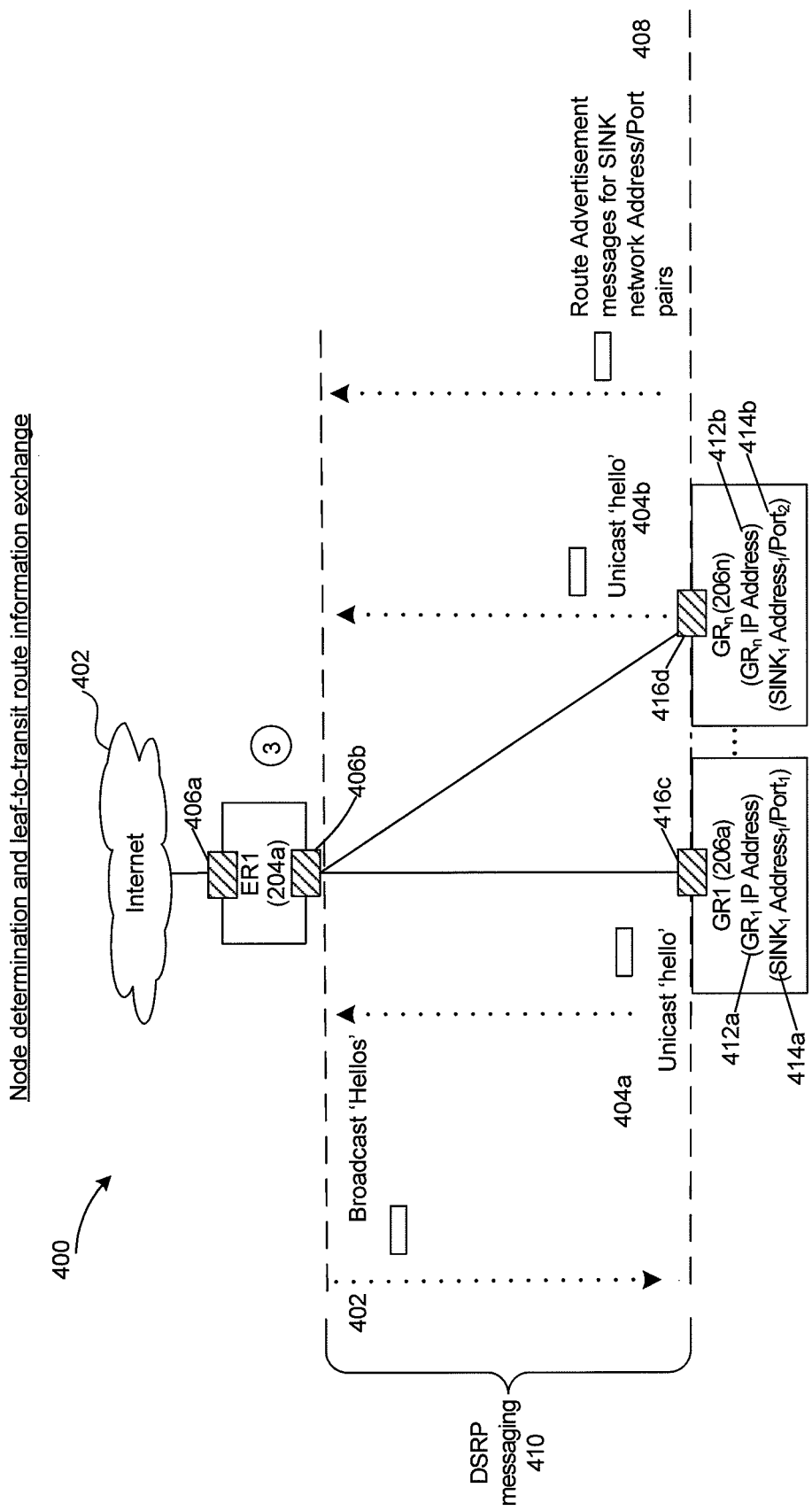
FIG. 4 is a network data flow diagram illustrative of an example of DSRP messaging.

FIG. 3 is a flow diagram 300 illustrating an example of how the software and/or hardware facility creates neighbor tables and routing tables. At step 302, an ER 204a-204n (e.g., ER 204a) broadcasts a message (e.g., a hello or request message) 402 to subnets associated with its network interfaces 406a-406b, as shown in FIG. 4. FIG. 4 is a network data flow diagram 400 illustrative of an example of DSRP messaging. FIG. 4 illustrates that ER1 204a broadcasts the message 402 via its interface 406b. In this example, GRs 206a-206n receive the broadcast message 402 via their respective network interfaces 416c-416d, and in turn, each reply by sending an a message (e.g., a hello message) 404a-404b for delivery to ER1 204a.

Returning to FIG. 3, at step 304, each GR that receives the hello request sends a response to the ER that sent the hello request. In some embodiments, messages 404a-404b are each unicast to ER1 204a, however, the software and/or hardware facility can, in some embodiments, send messages 404a-404b using other transport mechanisms (e.g., broadcast or multicast). Messages 404a-404b each include a network address (e.g., an IP address) of the respective GR (206a-206n) that sent the message 404 to ER1 (204a). For example, assuming GR1 206a has a network address 412a (e.g., 192.168.1.10), its message 404a includes that network address 412a. If, for example, GRn 206n was configured with a network address 412b of 192.168.1.20, its message 404b would include that network address 412b. In some embodiments, an ER (e.g., ER1 204a) broadcasts a request message 402 to an adjacent ER (e.g., ER2 204b) that responds with its own message (404).

Figure 5:
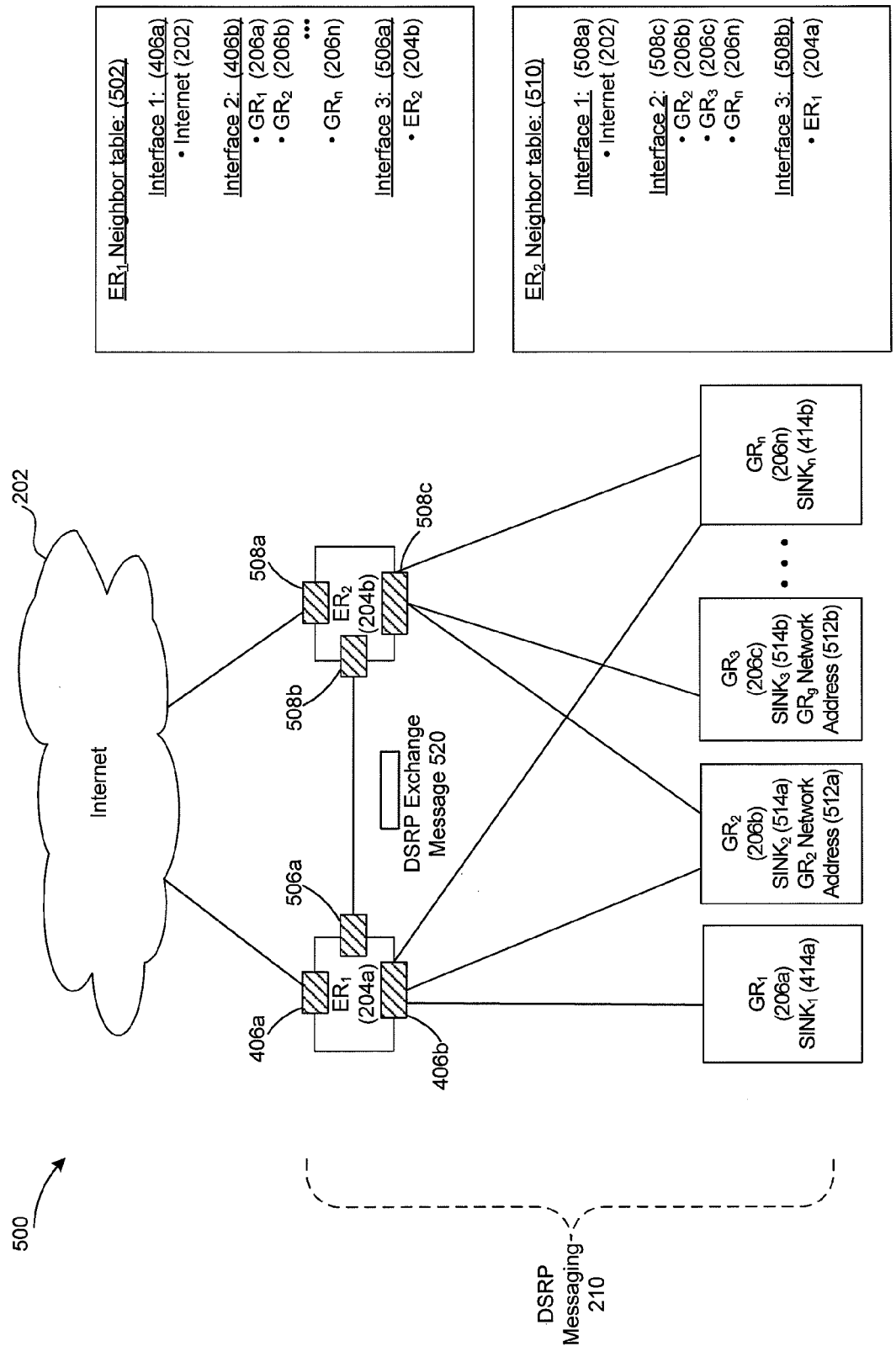
FIG. 5 is a network diagram showing an illustrative example for determining neighbor tables.

At step 306, ERs 204a-204n create their respective neighbor tables (502, 510) based on information, such as network addresses 412a-412b, included in the messages 404a-404b received from the GR 206a-206n, as further discussed in reference to FIG. 5. FIG. 5 is a network diagram 500 showing an illustrative example for determining neighbor tables. In particular, FIG. 5 illustrates an example of ER1's 204a neighbor table 502 and ER2's 204b neighbor table 510. As mentioned above, each GR 206a-206n responds to ER's 204a-204b request messages 402 by sending respective messages 404 for delivery to each of ER 204a and ER 204b. In this example, ER1's 204a has adjacent neighbors GR1 206a, GR2 206b, GR3 206n, ER2 204b, and Internet 202, each of which may respond to ER1's 204a request message 402 by sending respective messages 404a. The software and/or hardware facilities determine, based on the messages 404a, one or more entries for its neighbor table 502. Neighbor table 502 is created and/or modified, in some embodiments, by the software and/or hardware facilities by associating each of ER1's nodes 202, 204b, 206a, 206b, and 206n with the corresponding interfaces 406a, 406b, and 506a that received each message 404. For example, ER1's 204a neighbor table 502 associates interface 1 (406a) with a node in the Internet (202); interface 2 (406b) with GRs 206a, 206b, and 206n; and interface 3 (506a) with ER2 204b. Similarly, ER2 204b maintains a separate routing table 510 that includes nodes 202, 206b, 206c, 206n and 204a that are each connected to one of its various interfaces 508a-508c. ER2's 204b neighbor table 510 is created and/or modified by the software and/or hardware facilities to associate interface 1 (508a) with a node in the Internet (202); interface 2 (508c) with GRs 206b, 206c, and 206n; and interface 3 (508b) with ER1 204a. In some embodiments, each node in the neighbor tables 502 and 510 is associated with its corresponding network address 412a-412b and 512a-512b.

Referring to FIG. 3, at step 308, GRs 206a-206n, in some embodiments, advertise to ERs 204a-204n that they are sink points (i.e., end points) for a network address or network address-port pair 414a-414b ("sink address") (e.g., 192.168.1.1:1234), as further explained in reference to FIG. 4. FIG. 4, illustrates, among other things, route advertisement messages 408 sent from GR1 206a and GR2 206n, respectively, for delivery to ER1 204a. Route advertisements are, in some embodiments, initially sent after a hello 404 and periodically thereafter. Route advertisement messages 408 inform ERs, such as ER1 204a, that the sink address (e.g., 414a) is reachable via GR1 206a. In some embodiments, the route advertisement message 408 includes the sink address 414a-414b of the corresponding GR 206a-206n that sent the route advertisement message 408. For instance, if GR1 206a is the sink for sink address 414a (e.g., 17.17.17.1:5678), its route advertisement message 408 includes that sink address 414a. The timing of sending a route advertisement message 408 does not necessarily depend on the timing of sending messages 404a-404b. For example, in some embodiments, route advertisement messages 408 are sent before messages 404a-404b are sent for delivery to ER1 204a. In other embodiments, GRs 206a-206n send route advertisement messages 408 to ER1 204a after messages 404a-404b are sent for delivery to ER1 204a (as shown in FIG. 4).

Figure 6:
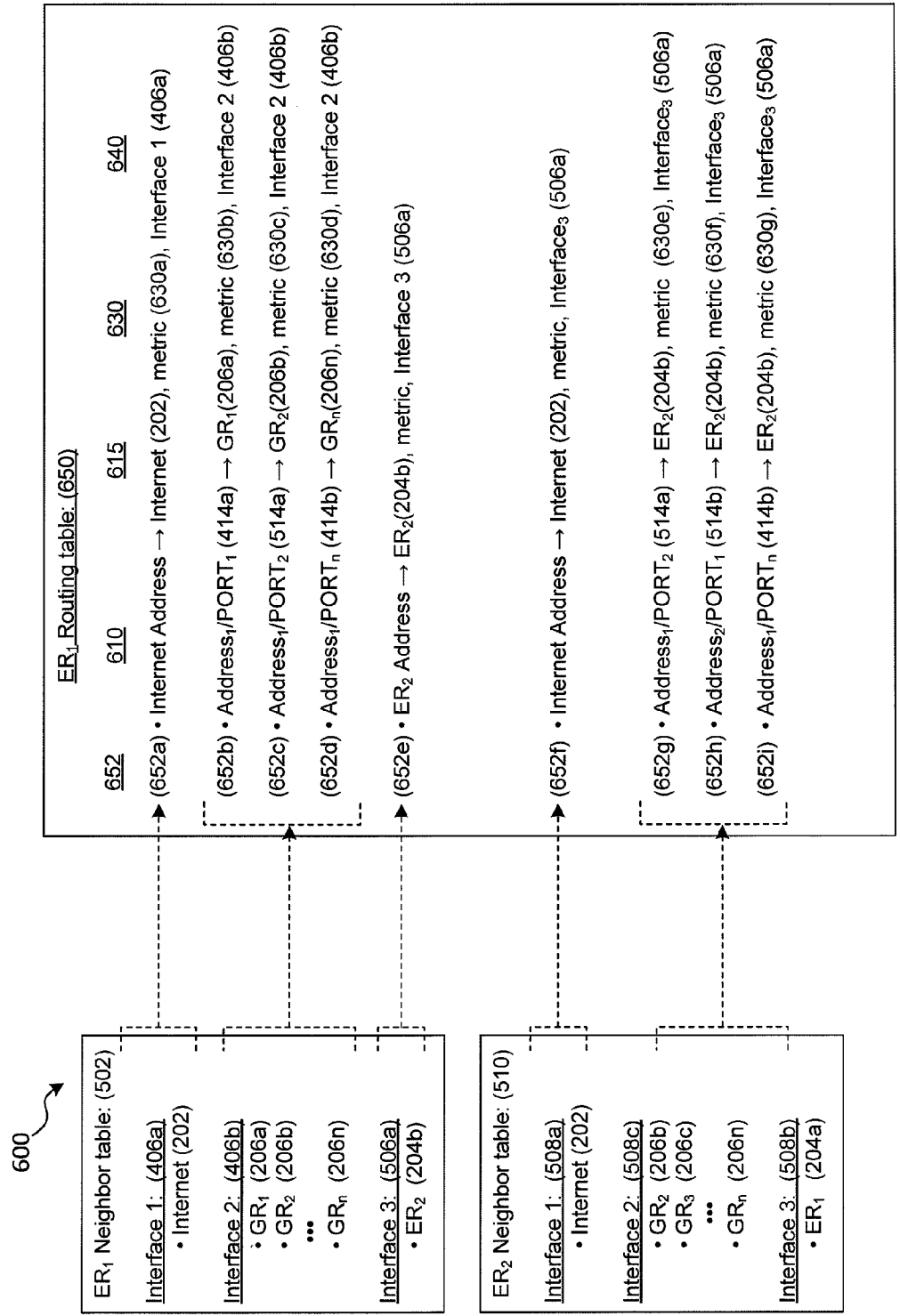
FIG. 6 is a network data flow diagram showing an illustrative example for determining a routing table.

Referring to FIG. 3, at step 310, ERs (e.g., ER1 204a) determine their respective routing tables (e.g., ER1 routing table 650) based on sink addresses 414a-414b included in the advertisement messages 404a-404b, their own respective neighbor tables (e.g., 502), and/or, in some embodiments, adjacent node's (e.g., ER2's 206a) neighbor table 510. Step 310 is further discussed in more detail in reference to FIG. 5-FIG. 6. FIG. 6 is a network data flow diagram 600 showing an illustrative example for determining a routing table. In particular, FIG. 6 is an example of how the software and/or hardware facility determines a routing table 650 for ER1 204a of FIG. 5. Routing table 650, in some embodiments, is a data structure (e.g., a data table) stored in and/or accessible to ER (e.g., ER1 204a) that lists adjacent routes 652. Routes 650 (e.g., 6552a-652i) are paths to a network destination 610 (e.g., GRs 204a-204n and other ERs) via a next hop node 615 (e.g. a neighbor node) and, in some cases, one or more metrics (distances) 630 associated with reaching the destination 610. In some embodiments an interface 640 that is associated with a next hop neighbor 610 is included as part of the route 652a-652i.

For example, in various embodiments, at least a portion of ER1's 204a routing table 650 is determined by the software and/or hardware facilities based on one or more advertisement messages 408 received from each of GR 206a, 206b and 206n; neighbor table 502; and ER2's 204b neighbor table 510. For example, routes 652b-652d are based on corresponding portions of neighbor table 502 (as illustrated by the dotted lines). Route 652b defines a path through ER1's interface 2 406 to reach GR1's 206a network address 412a, via next hop GR1 206a, based on a metric (630b) (e.g., metric value 10). Route 652c defines a path through ER1's interface 2 406 to reach GR2's 206a network address 514a, via next hop GR1 206a, based on a metric (630c). Route 652d defines a path through ER1's interface 2 406 to reach GRn's 206n network address 412b, via next hop GR1 206n, based on a metric 630d.

Neighbor tables 502 and 510, in some embodiments, are exchanged between respective ERs (e.g., between ER1 240a and ER2 240b) via one or more DSRP exchange messages (e.g., similar to DSRP exchange message 520 in FIG. 5) to facilitate network convergence, among other things, by disseminating each ER's respective neighbor tables 502 and 510 to each other for avoiding packet loss if, for example, any one ER should fail. ER1 Routing table 650 includes, among other routes, routes 652f-652i that correspond to routes in ER2's neighbor table 510. In this example, ER1's routing table 650 has at least two routes from ER1 240a to GR2 206b: 1) route 652c which provides a direct route via interface 2 406b to GR2 206 and 2) route 652g which provides a route from ER1 204a, via ER2 204b, to GR2 206b. Route 652g, in this example, defines a network path ER1 204a, via ER1's interface 3 506a, to GR2 206b by using ER2 204b as a next, intermediate network hop. In some embodiments, the technology manually and/or automatically applies a preference to which route (e.g., route 652g or route 652c) is chosen for communicating to GR2 206, based on, for example, each route's respective metric values (i.e., metric 630e and metric 630c). For example, route 652c may be chosen over route 652g because route 652g may have a higher metric 630e (e.g., a metric value of 100 than a value for route 652's metric 630c (e.g., a metric value of 10), based on the length of time for data to traverse each route to ER2 204b, among other things.

A network destination 610, in some embodiments, is an IP address and port pair (e.g., 192.168.100.1/24). The software and/or hardware facilities, in various embodiments, are configured to use the same IP address for multiple nodes by distinguishing different destinations 610 based on a unique port (e.g., TCP/UDP in the network address-port pair 414a-414b. For example, sink addresses 414a-414b and 514a-514b can share the same network address (e.g., 192.168.100.1) and different port numbers (e.g., TCP 80, TCP 12345, UDP 3500, UDP 1234, etc.) Each destination sink address 414a-414b and 515a-514b, in some embodiments, is associated with routing table entry 652 in routing table 650. Sharing network addresses can simplify IP address management and allow routes to be based on ports rather than on a unique IP address. In some embodiments, routes (e.g., route 652a and/or 652i) are static. Static routes are fixed rather than being the result of DSRP route exchange messages. Regardless of whether a route 652a-652i is static or exchanged via DSRP, each route can be based on a shared network address and unique port. Route 652e is similar to the routes described above.

Figure 7:
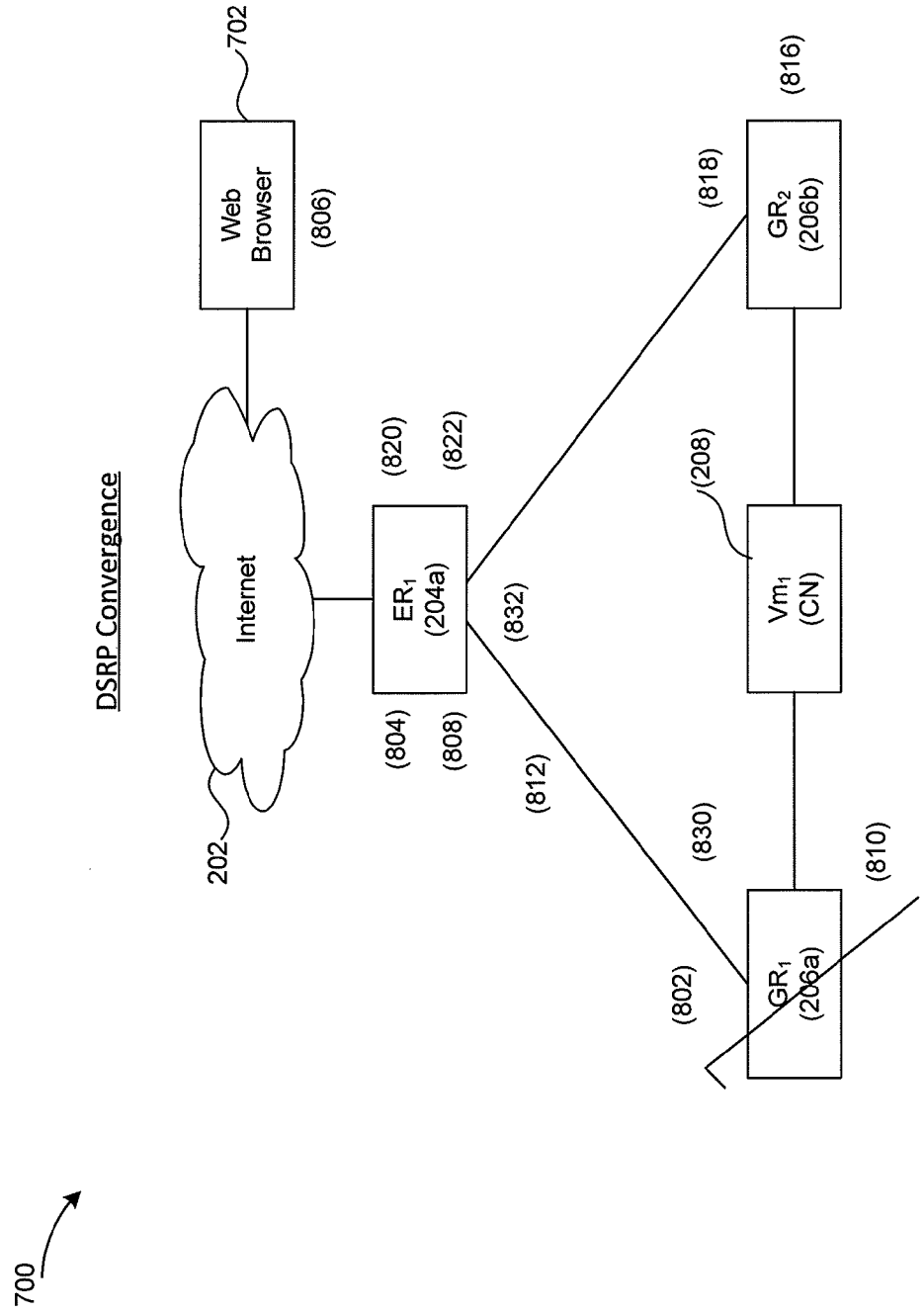
FIG. 7 is a network diagram showing an illustrative example of DSRP convergence.
Figure 8:
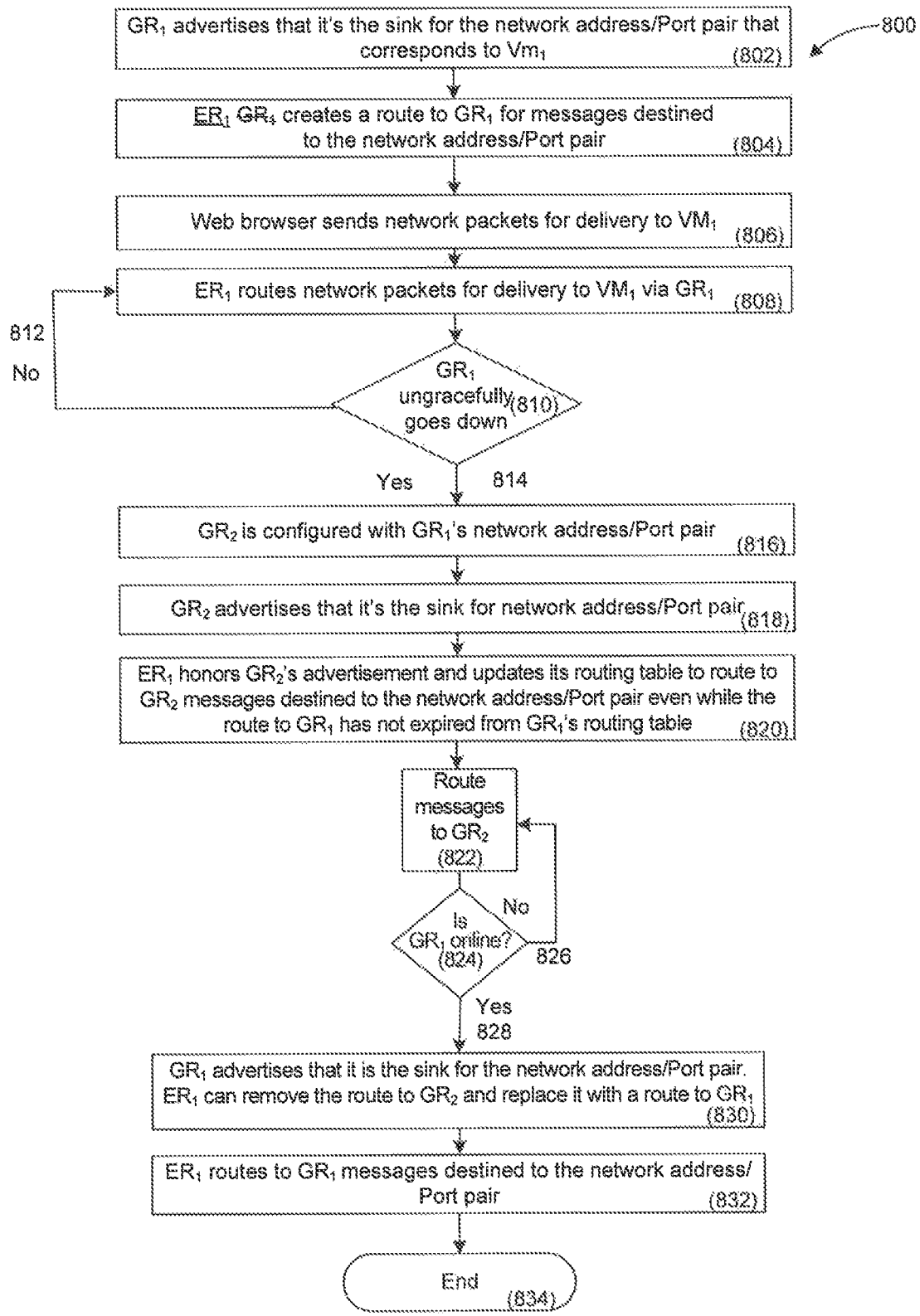
FIG. 8 is a flow diagram illustrating one example of how the software and/or hardware facility converges network routes.

FIG. 7 is a network diagram 700 showing an illustrative example of DSRP convergence. FIG. 7 includes a web browser 702 that is connected, via the Internet 202, to ER1 204a. ER1 204a is connected to GR1 206a and GR2 206b. GR1 206a and GR2 206b are each separately connected to one or more hosts 208 (e.g., virtual machines). FIG. 8 is a flow diagram 800 illustrating one example of how the software and/or hardware facility converges network routes. Flow diagram 800 describes steps to avoid SPOF after a node (e.g., GR1 206) ceases to function correctly (i.e., it goes down "ungracefully") and to converge the network tables. This can occur, for example, during a system failure and/or crash. At step 802, GR1 206a advertises that it is the sink for CN 208 (i.e., a VM configured with a particular network IP address port pair). In step 804, ER1 204a creates a route to GR1 206a. Step 806 describes that web browser 702 sends network packets (e.g., an HTTP request to view one or more hosts 208 user-interface) to ER1 204a. ER1 204a routes the network packets for delivery to host(s) 208 via GR1 206a. In step 810, the described technology, in one or more embodiments, determines whether GR1 206a has ceased to operate correctly, e.g., GR1 206a has had an ungraceful shutdown and become unavailable. If GR1 206a is available (e.g., it sends hello messages), then, in step 812, ER1 204a will continue to route packets, via GR1 206a, for delivery to host(s) 208. However, if GR1 206a is unavailable (e.g., GR1 206a had an "ungraceful" crash without informing ER1 204a) then, in step 816, GR2 206b is configured as the sink for the network address port pair. In step 818, GR2 206b advertises to ER1 204a that it is the sink for the network address port pair. In step 820, ER1 204a honors GR2's advertisement and updates its routing table (e.g., 650) to route to GR2 206b any traffic that is destined to the sink address, even while the previous route to the sink address has not expired and/or has been not been removed from ER1's 204a routing table (e.g., 650). Therefore, in some embodiments, the software and/or hardware facilities determines routes based on the last (i.e., the more recent) route advertisement message 408. In step 822, web browser's 702 traffic is routed to GR2 via the new route. In step 824, the decision is made whether or not GR1 is now available. If GR1 206a is not available, step 826, traffic will continue to be routed to GR2 206b to reach host 208, step 822. However, if GR1 206a is available, the process flows to step 830. At step 830, GR1 206a advertises that it is the sink for host 208, for example, and ER1 204a creates a route to host(s) 208 via GR1 206a. At step 832, ER1 204a routes web browser 702 traffic to host(s) 208 via GR1 206a, because that route was the most recently received route in the routing table (e.g., routing table 650.) The flow ends at step 834.

Figure 9:
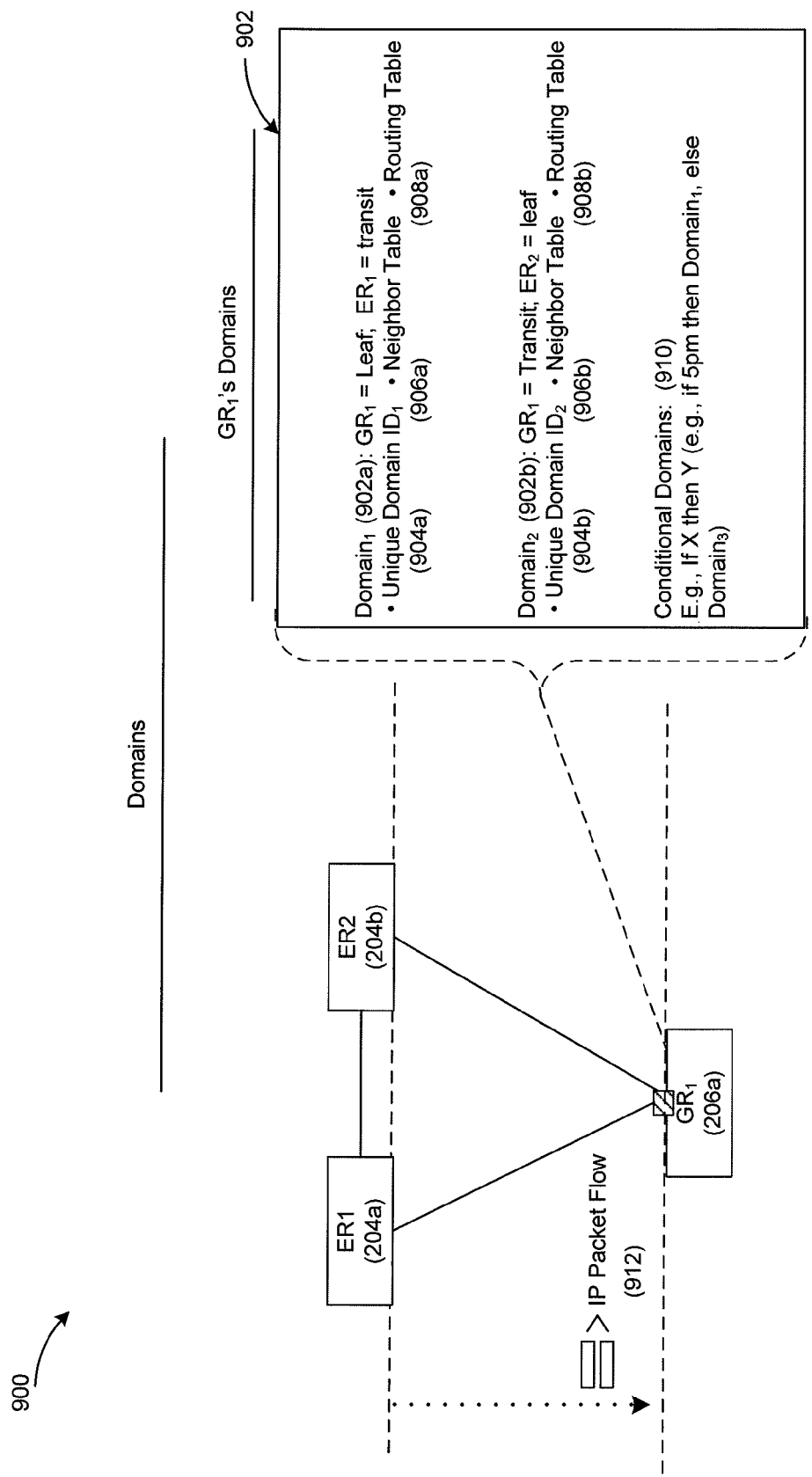
FIG. 9 is a network data flow diagram illustrative of an example of domains.

FIG. 9 is a network data flow diagram 900 illustrative of an example of domains. In particular, FIG. 9 shows various domains 902a-902b that are associated with a single node, GR1 206a. A domain provides, among other things, network address isolation from other domains; therefore, a single domain can use the same network address-port pairs on the same subnet as another domain. Domain information, in some embodiments, is maintained in a data structure, such as a domain table 902. Domains have features similar to the features described in reference to FIGS. 2-8. For example, each domain 902a-902b can have its own routing table 650, neighbor tables 502 and 510, sink addresses 414a-414b and 514a-514b, network addresses 414a-414b and 514a-514b, and DSRP messaging 210, etc. Each domain 902a-902b, in some embodiments, is configured automatically by the software and/or hardware facilities. In some embodiments, a node 204a-204b and 206a-206n can be configured as a GR and/or a ER. For example, GR1 206a can be configured from operating based on a first domain (e.g., domain 1 902a) to operating based on a second domain (e.g., domain 2 902b) where, in the second domain, GR1 206a is configured to send response request messages 402 (e.g., hello messages), send and receive neighbor table 906a-906b information, create routing tables 908a-908d, etc. In some embodiments, a domain 902a-902b is activated based on the occurrence of a condition, such as a time of day, a destination, a source, a user type, etc.

To determine which domain 902a-902b a data packet of a packet stream 912 belongs, the software and/or hardware facilities, in some embodiments, associates a unique domain ID 904a-904b with each respective domain and associates DSRP messages 210 (e.g., packets 912) with a separate domain identifier based on, for example, one or more of an inbound interface, destination address information, source addressing information, and events (e.g., time of day). For instance, if a packet's 912 destination address is associated with a particular domain ID (e.g., based on the packet's subnet 192.168.0.0/24), the packets 912 may use domain 2's 902b configurations (e.g., 906a and 908a) provided that the domain ID associated with the data packets 912 match the unique domain ID (904b) associated with Domain 2 902b. Otherwise, the data packets 912 may default to Domain 1 902a or be dropped.

In general, the detailed description of embodiments of the software and/or hardware facilities is not intended to be exhaustive or to limit the software and/or hardware facilities to the precise form disclosed above. While specific embodiments of, and examples for, the software and/or hardware facilities are described above for illustrative purposes, various equivalent modifications are possible within the scope of the software and/or hardware facilities, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the software and/or hardware facilities provided herein can be applied to other systems, not necessarily the system described herein. The elements and acts of the various embodiments described herein can be combined to provide further embodiments.

These and other changes can be made to the software and/or hardware facilities in light of the above Detailed Description. While the above description details certain embodiments of the software and/or hardware facilities and describes the best mode contemplated, no matter how detailed the above appears in text, the software and/or hardware facilities can be practiced in many ways. The software and/or hardware facilities may vary considerably in its implementation details, while still being encompassed by the software and/or hardware facilities disclosed herein. As noted above, particular terminology used when describing certain features or aspects of the software and/or hardware facilities should not be taken to imply that the terminology is being redefined herein to be restricted to any specific characteristics, features, or aspects of the software and/or hardware facilities with which that terminology is associated. In general, the terms used in the following claims should not be construed to limit the software and/or hardware facilities to the specific embodiments disclosed in the specification, unless the above Detailed Description section explicitly defines such terms. Accordingly, the actual scope of the software and/or hardware facilities encompasses not only the disclosed embodiments, but also all equivalent ways of practicing or implementing the software and/or hardware facilities.

We claim:

1. A computer-implemented method performed in a distinguished node to participate in a routing protocol, comprising:
    monitoring a network for routing protocol request messages, wherein the network is a partial mesh network, wherein the partial mesh network includes a plurality of logical network domains identifiable by respective domain IDs that are unique to each logical network domain and wherein each logical network domain is associated with a respective neighbor table for routing information within that particular logical network domain;
    receiving at least one routing protocol request message broadcast across the network by a transit device, wherein a first domain ID of the respective domain IDs is including within the at least the routing protocol request message;
    determining whether the first domain ID included in the routing protocol request message matches a second domain ID; and
    only in response to determining that the first domain ID included in the routing protocol request message matched the second domain ID, sending a routing protocol acknowledgment message having the same ID as the first domain ID for delivery to the transit device so that the transit device can augment a neighbor table associated with the first domain ID to include information from the routing protocol acknowledgment message.

2. The computer-implemented method of claim 1 wherein a first domain is associated with a neighbor table that is separate from a neighbor table of a second domain of the plurality of domains, and wherein each domain of the plurality of domains is associated with a unique domain ID.

3. The computer-implemented method of claim 1 wherein the request message and the routing protocol acknowledgment message are each hello messages.

4. The computer-implemented method of claim 1 wherein the routing protocol acknowledgment message is unicast, via the network, for delivery to the transit device.

5. At least one tangible computer-readable medium having instructions that when executed by at least one data processing device, provides a routing protocol technology, comprising:
    from each of a plurality of virtual nodes in a virtual computing environment, receiving an advertisement message via a virtual network in the virtual computing environment, wherein each advertisement message includes a network address-port pair associated with a corresponding node, wherein the network address-port pair is a network address and a TCP or UDP port; and
    determining an entry in a routing a table for each unique port in the network address-port pairs, wherein at least a plurality of the network addresses of the network address-port pairs have the same value, and wherein each entry in the routing table associates each network address-port pair with a routing metric and a virtual network interface that received the advertisement message; and in response to a first virtual node of the plurality of virtual nodes becoming unavailable, identifying an entry in the routing table for routing portions of a packet stream from the first virtual node of the plurality of nodes to a second node of the plurality of virtual nodes, wherein the entry is identified at least based on the network address-port pair advertised by the second virtual node of the plurality of nodes.

6. The at least one tangible computer-readable medium of claim 5 further comprising:
broadcasting a request message, via the interface, to the virtual network in the virtual computing environment;
receiving a routing protocol acknowledgment message, in response to the broadcast request message; and
determining a neighbor table based on the routing protocol acknowledge message, wherein the neighbor table associates a node of the plurality of virtual nodes, a network address of the node, and the virtual network interface.

7. The at least one tangible computer-readable medium of claim 5 wherein the routing metric is a computation of a minimum bandwidth on a network path between virtual nodes and a total delay to compute the routing metric, wherein the network address is an IP address.

8. A computer-implemented method in a virtual computing environment, comprising:
determining a route, in the virtual computing environment, to a first virtual node for a packet stream, based on a first network address-port pair advertised by the first virtual node;
when the first virtual node becomes unavailable, routing portions of the packet stream, via the virtual computing environment, to a second virtual node, wherein the route to the second virtual node is determined based on a second network address-port pair advertised by the second virtual node, wherein the first network address-port pair advertised by the first virtual node is equal to the second network address-port pair advertised by the second virtual node; and
routing, via the virtual computing environment, a portion of the packet stream to the first virtual node based on a route determined by a third network address-port pair advertised by the first virtual node after the first virtual node is available, wherein the route to the first virtual node has not expired when the portion of the packet stream is routing to the second node.

9. The computer-implemented method of claim 8 wherein the first network address-port pair, the second network address-port pair, and the third network address-port pair are equal.

10. The computer-implemented method of claim 8 wherein further including, removing the route to the second virtual node when the first virtual node is determined to be available.

11. At least one tangible computer-readable storage device having contents that when executed by at least one data processing device, provides a routing protocol, comprising:
monitoring a network for routing protocol request messages, wherein the network is a partial mesh virtual network, wherein the partial mesh network includes a plurality of logical network domains identified by respective domain IDs that are unique to each logical network domain, and wherein each logical network domain is associated with a respective neighbor table for routing information within that particular logical network domain; and
only in response to determining that a first domain ID included in a routing protocol request message matches a second domain ID, sending a routing protocol acknowledgement message having the same ID as the first domain ID for delivery to the transit device so that the transit device can augment a neighbor table associated with the first domain ID to include information from the routing protocol acknowledgment message.

12. The at least one tangible computer-readable storage device of claim 11 wherein the request message and the routing protocol acknowledgment message are each hello messages and the routing protocol acknowledgment message is unicast, via the partial mesh virtual network, for delivery to the transit device.

13. One or more hardware computer systems implementing a virtual computing environment, each including at least one processor, comprising:
a network routing table for determining a route to a first node for a packet stream, based on a first network address-port pair advertised by the first node;
when the first node becomes unavailable, a first network interface for routing portions of the packet stream to a second node, wherein the route to the second node is determined based on a second network address-port pair advertised by the second node, wherein the first network address-port pair advertised by the first node is equal to the second network address-port pair advertised by the second node; and
a second network interface for routing a portion of the packet stream to the first node based on a route determined by a third network address-port pair advertised by the first node after the first node is available, wherein the route to the first node has not expired when the portion of the packet stream is routing to the second node.

14. The one or more hardware computer systems of claim 13, wherein the first network address-port pair, the second network address-port pair, and the third network address-port pair are equal.

* * * * *

UNITED STATES PATENT AND TRADEMARK OFFICE
CERTIFICATE OF CORRECTION

PATENT NO. : 9,294,384 B2
APPLICATION NO. : 13/842766
DATED : March 22, 2016
INVENTOR(S) : Holland et al.

Page 1 of 1

It is certified that error appears in the above-identified patent and that said Letters Patent is hereby corrected as shown below:

On the title page

Column 2, "Primary Examiner", line 1, delete "Hahn N Nguyen" and insert -- Hanh N Nguyen --, therefor.

In the drawings

On sheet 1 of 9, Figure 1, Reference Numeral 110, line 1, delete "Nctwork" and insert -- Network --, therefor.

In the specification

Column 5, line 43, before "a" delete "an".

Column 7, line 26, delete "DSPR" and insert -- DSRP --, therefor.

Column 7, line 34, delete "240a" and insert -- 204a --, therefor.

Column 7, line 38, after "path" insert -- from --.

Column 7, line 47, delete "100" and insert -- 100) --, therefor.

Signed and Sealed this
Fifth Day of July, 2016

Michelle K. Lee
*Director of the United States Patent and Trademark Office*